(No Model.)

W. H. CLARK.
VARIABLE SELF ADJUSTING ENGINE.

No. 264,063. Patented Sept. 12, 1882.

7 Sheets—Sheet 1.

Witnesses:   Inventor:

(No Model.)

W. H. CLARK.

VARIABLE SELF ADJUSTING ENGINE.

No. 264,063. Patented Sept. 12, 1882.

7 Sheets—Sheet 2.

Witnesses:

Inventor:

(No Model.)  7 Sheets—Sheet 3.

W. H. CLARK.
VARIABLE SELF ADJUSTING ENGINE.

No. 264,063.  Patented Sept. 12, 1882.

Witnesses  Inventor:
Albert H. Adams  William H. Clark (No Model.) 7 Sheets—Sheet 4.
W. H. CLARK.
VARIABLE SELF ADJUSTING ENGINE.
No. 264,063. Patented Sept. 12, 1882.
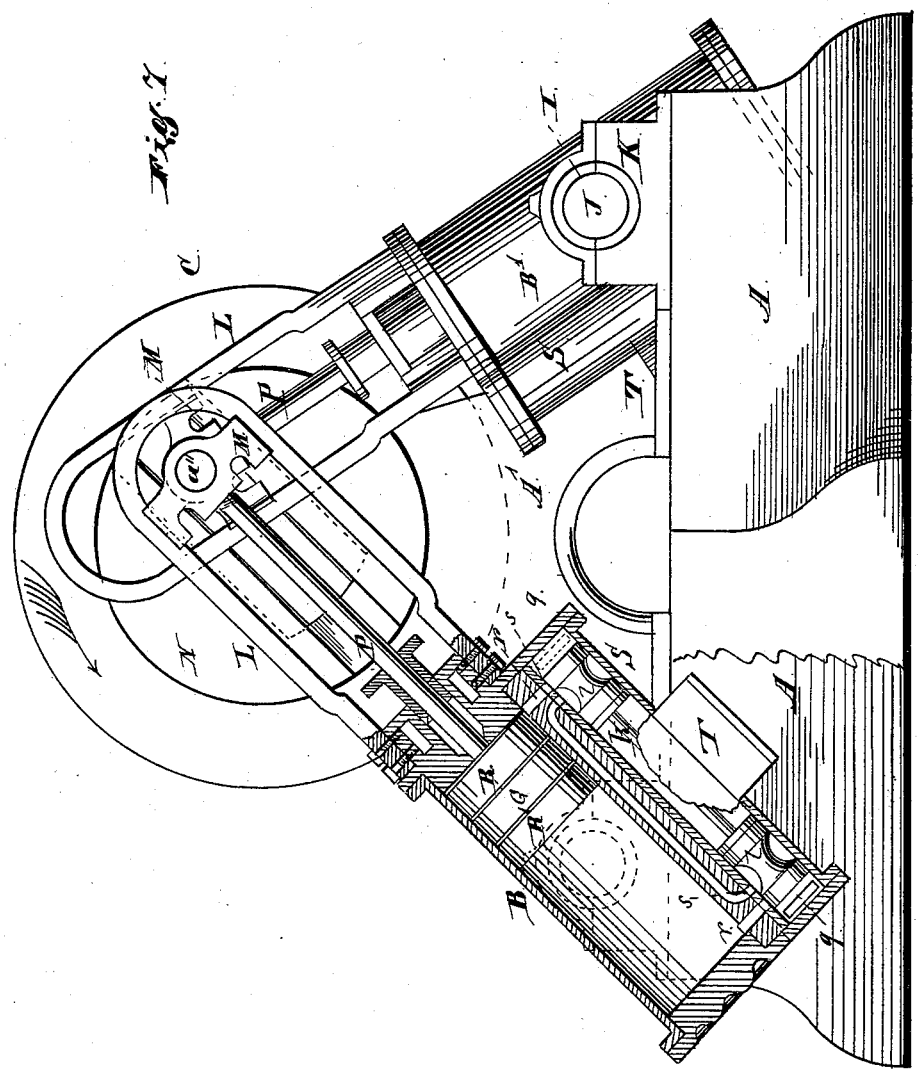

(No Model.) 7 Sheets—Sheet 5.
W. H. CLARK.
VARIABLE SELF ADJUSTING ENGINE.
No. 264,063. Patented Sept. 12, 1882.
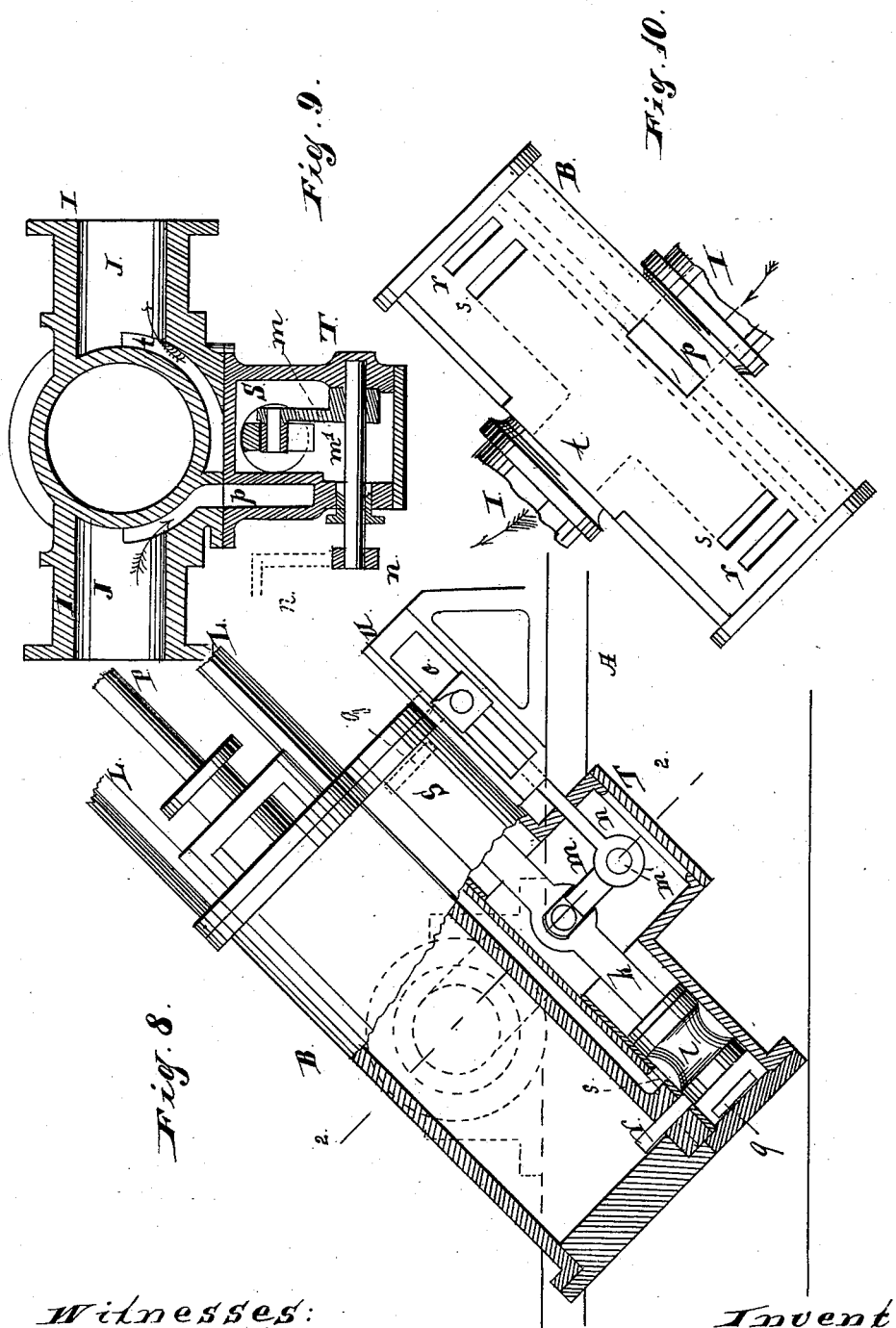

(No Model.) 7 Sheets—Sheet 6.

W. H. CLARK.
VARIABLE SELF ADJUSTING ENGINE.

No. 264,063. Patented Sept. 12, 1882.

Witnesses:
O. W. Bond
Albert H. Adams

Inventor:
William H. Clark (No Model.) W. H. CLARK. 7 Sheets—Sheet 7.
VARIABLE SELF ADJUSTING ENGINE.
No. 264,063. Patented Sept. 12, 1882.

Witnesses:
O. W. Bond
Albert H. Adams

Inventor:
William H. Clark

UNITED STATES PATENT OFFICE.

WILLIAM H. CLARK, OF CHICAGO, ILLINOIS.

VARIABLE SELF-ADJUSTING ENGINE.

SPECIFICATION forming part of Letters Patent No. 264,063, dated September 12, 1882.

Application filed June 30, 1882. (No model.)

*To all whom it may concern:*

Be it known that I, WILLIAM H. CLARK, residing at Chicago, in the county of Cook and State of Illinois, and a citizen of the United States, have invented new and useful Improvements in Variable Self-Adjusting Engines, of which the following is a full description, reference being had to the accompanying drawings, in which—

Figure 1:
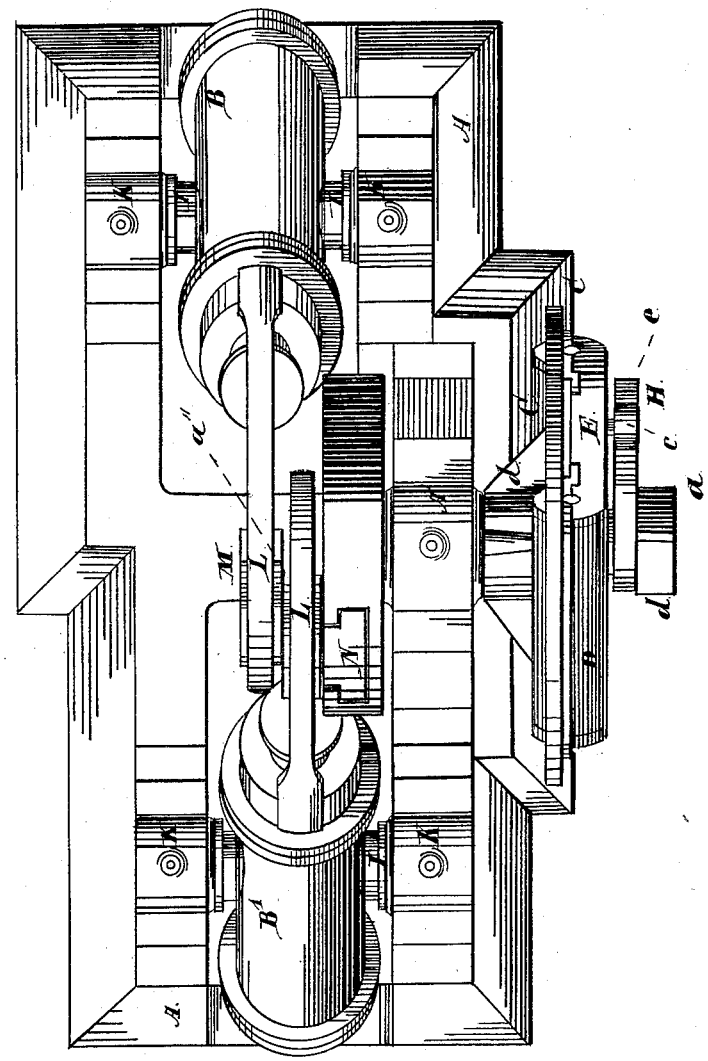
Figure 2:
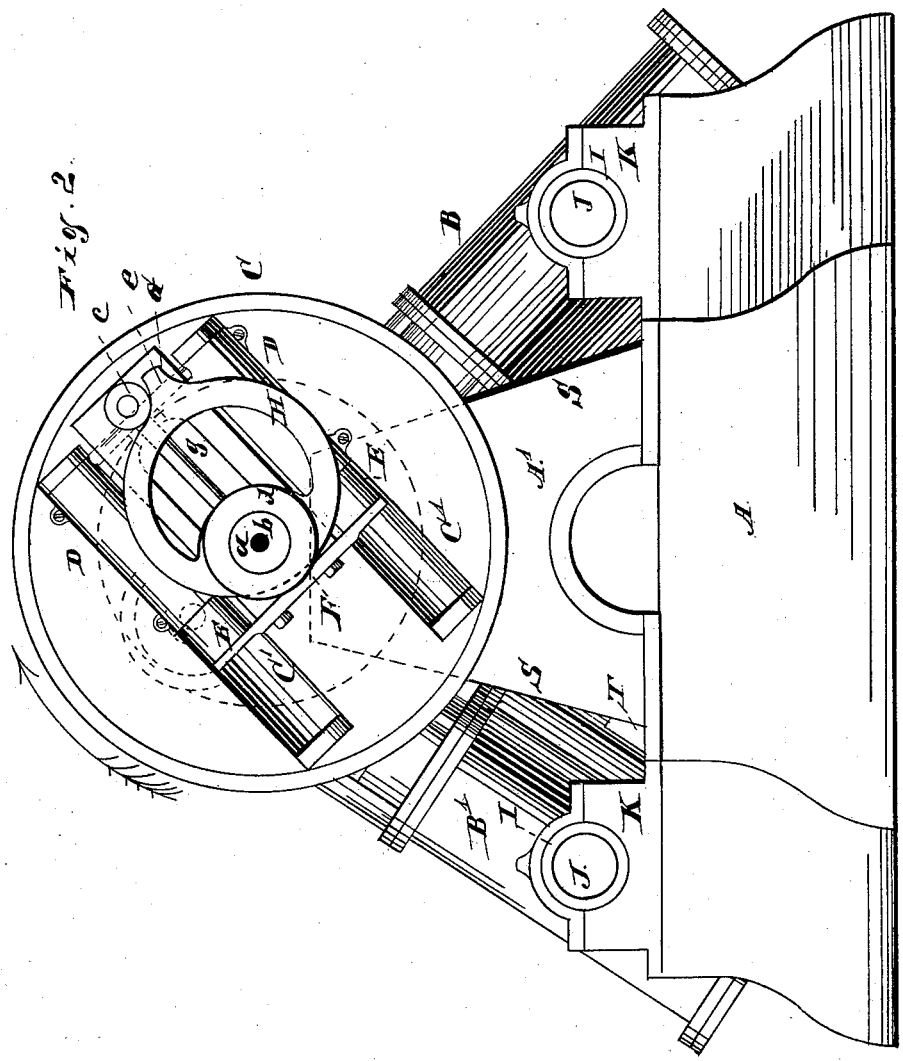
Figure 3:
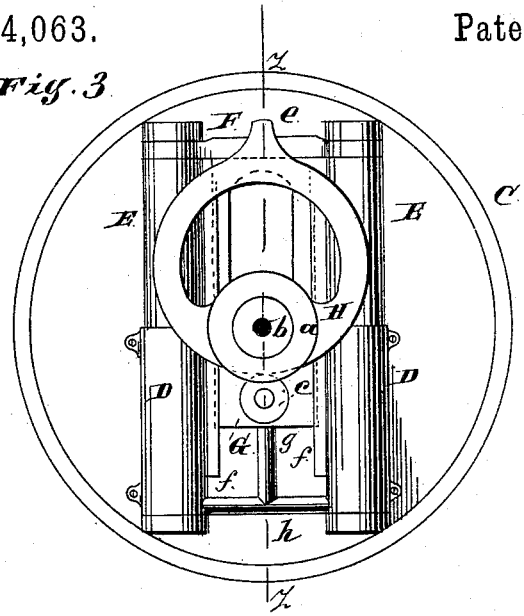
Figure 4:
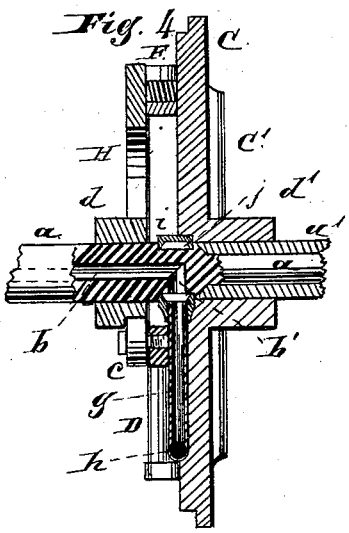
Figure 5:
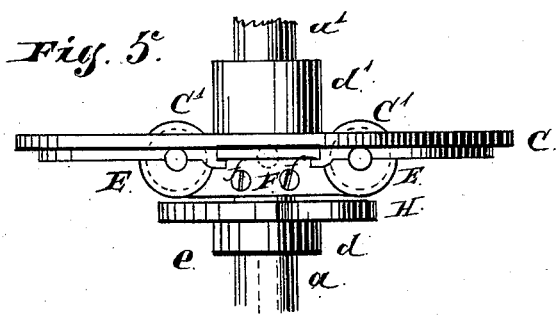
Figure 6:
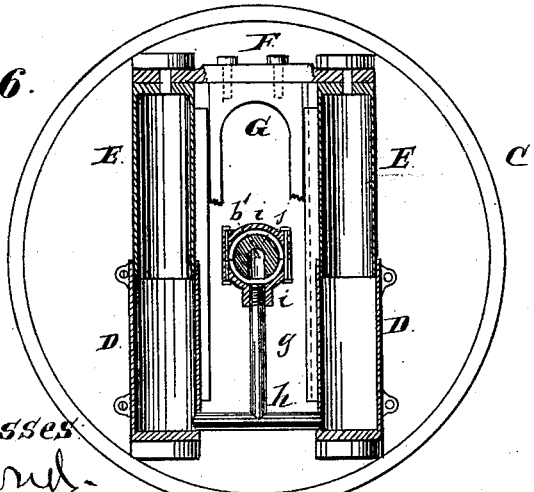
Figure 11:
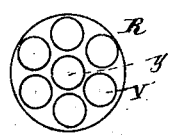
Figure 12:
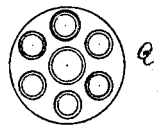
Figure 13:
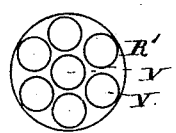
Figure 14:
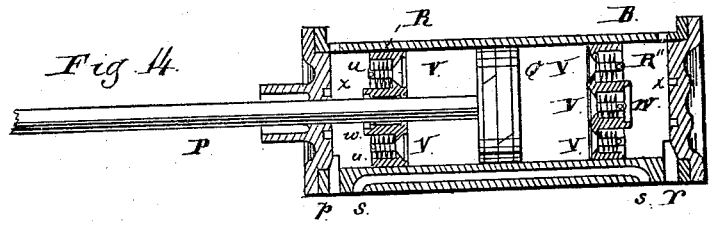
Figure 15:
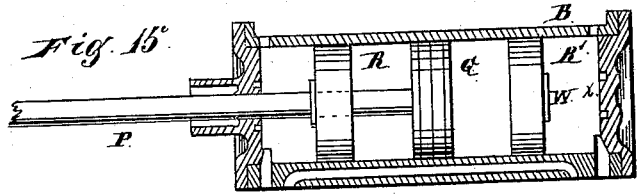
Figure 16:
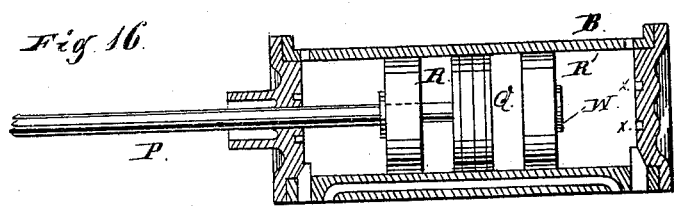
Figure 17:
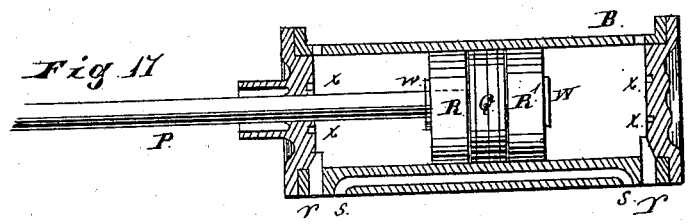
Figure 18:
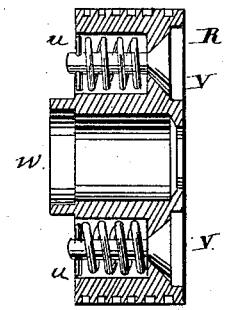
Figure 19:
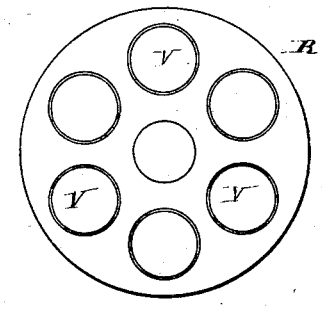
Figure 20:
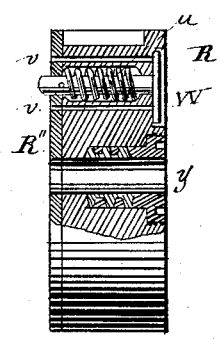
Figure 21:
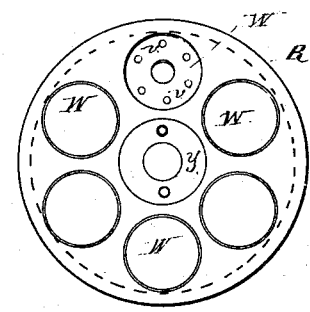

Figure 1 is a top or plan view; Fig. 2, an elevation of the back or working side of the machine; Fig. 3, an elevation of the steam or spring disk of the crank; Fig. 4, a vertical cross-section on line 1 1 of Fig. 3; Fig. 5, a top or edge view of the steam-disk and its attachments; Fig. 6, an elevation of the steam-disk, with the crank-cylinders and piston or plungers in section; Fig. 7, a front elevation of the machine with the base partly broken away and one of the driving-cylinders in section; Fig. 8, a side elevation, partly in section, of one of the driving-cylinders and its valve-gear; Fig. 9, a cross-section on line 2 2 of Fig. 8; Fig. 10, an under view of a driving-cylinder, with the valve or steam chamber removed to show the ports; Figs. 11, 12, and 13, face views of the piston-head and the additional or false piston-heads; Fig. 14, a longitudinal vertical section of the steam-cylinder and secondary or false piston-heads; Figs. 15, 16, and 17, similar sections of the cylinder, showing the additional or false piston-heads in various positions; Figs. 18 and 19, enlarged section and face view of the false piston having V-shaped valves; Figs. 20 and 21, a similar section and face view, showing rectangular valves with perforations or holes; and Fig. 22, a still further enlarged view and partial section of one of the secondary or false piston-heads.

The object of this invention is to provide an engine having a variable stroke with additional or false piston-heads, so as to adapt the capacity of the cylinder to the length of the piston-stroke without any unnecessary waste of steam, air, or other fluid used in operating the same; in connecting an engine having a variable-stroke piston with a self-adjusting crank, so that the piston and crank will relatively control each other and regulate the amount of power required and the amount of steam used, and by such combination to effect a saving in steam or other fluid used for the motor; to avoid unnecessary length of stroke by the piston and the consequent wear and tear of machinery, and to adjust the amount of steam approximately near to the amount of service required of the crank or crank-shaft.

The nature of my invention consists in providing the main or driving cylinders of an engine with secondary and independent piston-heads or cylinder-heads, (either name being appropriate;) in providing such independent or secondary heads with valves; in the novel arrangement of the stop-motion; in making the self-adjusting crank operate according to the pressure of the steam driving the cylinders; in so combining the self-adjusting crank with a piston having a variable stroke that each shall be adapted to the other; in combining a variable self-adjusting cylinder-piston with a variable self-adjusting main-shaft crank and a variable self-adjusting cut-off or stop-motion, and in the several combinations of parts hereinafter set forth and claimed as new.

In the drawings, A indicates the base, upon which the working-cylinders are supported; A', a post or superstructure, upon which the crank-shaft is supported; B, the left and B' the right hand cylinder, the crank-pin side shown at Fig. 7 being regarded as the front; C, a disk or plate, to which the steam-cushions or resistants are applied for adjusting the resistance of crank motion to the work or load; C', recesses or depressions therein for the small cylinders D D; D, small steam-cylinder or rams; E, a cylinder or plunger fitting in D; F, cross-head connecting the small cylinders or plungers E E together; G, block or frame carrying the pin *c;* H, eccentric or cam for controlling the movements of the plungers E E and through them the variations of the crank; I, trunnions on the cylinders B B'; J, hollows or cavities therein; K, supports and boxes for the trunnions; L, guide frames or bars to relieve the piston-rods from lateral or side strain; M, head-blocks on the outer ends of pistons; N, disk or plate supporting the adjustable crank-pin; O, crank-pin slide; P, piston-rods; Q, piston-head; R R', secondary or independent piston-heads or auxiliary heads; S, steam and valve chamber; T, an extension of the valve-chamber for connecting and partly operating the valves; U, guide-frame supporting a part of the stop-motion; V, conical and W rectangular spring-valves in the secondary heads R R'; a, the working section or end of the main shaft, to which the driving-pulley or other means for transmitting power is attached; a', the hollow shaft, to which the disks C and N are attached; a'', the crank-pin; b b', steam passage or opening in the shaft a for operating the small cylinder D; c, pin on the sliding frame G, operating against and with the eccentric H; d d', hubs or collars for attaching the eccentric and disk C to the main shaft; e, limit projection or stop on the eccentric H; f, guides on the small cylinders D for the block G; g h, steam-pipes leading from the shaft a to the small cylinders D; i, cap or collar forming the steam space or passage around the shaft a, Figs. 4 and 6; j, a steam-passage around the main shaft; k, rod or bar connecting the cut-off valves together; l, cut-off valves; m, m', and n, arm, shaft, and bar for operating the cut-off valves; o, sliding block on the outer end of the arm n; p, steam-passage from the trunnion to the steam or valve chamber; q, ports for the passage of steam into the steam-chest; r, induction-ports to the main cylinders; s, exhaust-ports; t, passage for exhaust-steam to the opposite trunnion from which it entered; u, springs on valves; v, holes or steam-passages under the valves W; w, projecting ring on the outer faces of the secondary piston-heads, fitting the annular recesses of the main cylinder-heads to prevent jarring or rattling in case they come in contact; x, annular recesses into which the annular projections w fit; y, metallic stuffing-box for fitting the secondary piston-head R around the piston-rod.

The base A may be cast in the form shown; or it may be a base-plate supported on masonry or such other support as is usual for steam or other engines. As shown, it is provided with supports K and openings for the cylinders B B', sufficiently out of line with each other to permit of the attachment of the piston-rods by their heads M to the crank-pin without bending the piston-rods.

The cylinders B B' are of the kind known as oscillating. They are supported by the hollow trunnions I upon the boxes and supports K of the base. Upon the under or inner parts of these cylinders steam chests or chambers S are applied in the usual manner. These steam-chests are provided with an extension, T, in which the stop-motion for the valve-gear is supported. The construction of the cylinders B B' in respect to the application of the heads to the cylinders and the attachment of a steam-chest does not differ from that in ordinary use, and is not therefore particularly described.

The shaft a a' is suitably mounted and journaled on the post A', which, as shown, is a single one; but it is obvious that one or more are to be used, according to the length of the compound shaft. The special construction of this shaft a a' and the method of attaching the disks C and N are fully described and shown in my former Patent No. 253,265, to which reference is made for this purpose, and also for the purpose of giving the special construction of the sliding plate O and its attached crank-pin a'', as the crank shown and described in said patent is the same in construction as the one here shown, with the exception of the attachments to the plate or disk C for using steam instead of springs for operating the crank-pin adjustments; and it will be understood that, if desired, the entire adjustable crank of said patent may be substituted for the one here shown. The plate or disk C, which may of itself be the balance-wheel, or be the hub to which the spokes of the balance-wheel are attached, is secured to the hollow shaft a' by a collar, d', as shown, or by other suitable means. The plate C, for convenience in attaching the parts and for economy of space, is provided with cylindrical recesses C', in which the small steam-cylinders D are permanently attached and the plungers E move up and down. The cylinders D are attached by ears or lugs, as shown, and on the sides next the shaft they are provided with guides f, which are fitted to corresponding grooves in the block G, which is connected with and supported upon the plungers E E by the cross-head F. The plungers E, as shown, are also hollow cylinders; but it is evident that their lower ends may be capped, and that, if desired, they may be made solid, as they will work equally well when of either construction. The plungers E are made to slide back and forth in the cylinders D, and are fitted thereto by metal stuffing-boxes or otherwise, so as to prevent leakage of steam.

The shaft a is provided with a hole or steam-passage, b, which is met at the proper point by a radial hole, b', which radial hole connects with an annular passage, j, formed by turning a slight groove in the shaft or in the boxing i, fitting at this point so that in whatever position the holes b' may be steam would be free to pass into this annular or circumferential passage. This passage j is connected with the steam-pipe g and cross-pipe h, as shown in Figs. 4 and 6. Steam is admitted by connecting the opening or passage b by suitable connection with the steam or feed pipe, just back of or so as to be free from the steam-chest, so that steam will pass without obstruction through the passages b b' j and pipes g h into the small cylinders D with the boiler-pressure or the same pressure that operates the piston-cylinders B B', thus making the pressure between all of the cylinders uniform.

To the shaft a is attached the eccentric or cam H by a suitable hub or collar, d, or otherwise, and in close proximity to the disk C, with the attachments, as shown at Fig. 5. This eccentric is made in the form shown, so that it may operate when turned in either direction, and it is provided with a stop, e, which prevents the pin c from passing the middle or from getting beyond the limit. The pin c is attached to the sliding block G, and is provided with an anti-friction collar or roller.

The parts are shown at rest at Fig. 3 and at the extreme limit of the movement in Fig. 2, the plugers E being respectively at the limits of extension and depression.

The operation of this part of the described machine and its effect upon the self-adjustment of the crank are as follows: The steam entering the cylinders D forces the plungers E to their outer limit (said plungers, by means of the cross or connecting bar F, carry with them the sliding block G) and hold them in the said position to the extent of the pressure of the steam against the plungers, in which position the pin $c$ is nearest the center. The disk C being attached to the hollow shaft $a'$ and the eccentric H to the shaft from which the power is transmitted, and the crank-disk N being also upon the hollow shaft $a'$, the rotation of the crank will cause the pin $c$ to traverse the eccentrics H until the equalizing point or the stop $e$ is reached, and from either of which points the shafts $a\ a'$ continue to rotate together. As the power transmitted or service to be performed increases, if the pin $c$ has not reached its limit it will continue to travel toward the stop $e$ until the equalizing-point is reached, and as the strain is diminished the pressure of steam in the small cylinders D forces the plungers E outward, which movement causes the eccentric H to react upon the pin $c$, forcing it in the direction of its inner or lowest position, which direction it will continue to follow until the outward limit of the plungers E is reached, or until the power and pressure are equalized, when the rotation of the two sections $a\ a'$ of the main shaft again continues as though both constituted a single shaft. It will thus be seen that the steam-pressure and the service performed equalize each other at any and all points between the initial pressure and the limit-stop $e$. Whenever the work required is beyond this point the stop $e$ serves to lock or hold the parts so that the rotation continues without interrupting the operation of the machine.

The advantage of using steam instead of springs for operating the plungers E or cross-head F is that with steam the full throw of the crank can be had at low pressures, while, owing to the uniform action of springs, the full throw of the variable crank cannot be had with low pressures. The disk N carries the sliding block O, which is provided with the crank-pin $a''$, and the sliding block is moved longitudinally by an eccentric on the end of the shaft $a$, as described in my former patent, so that the crank-pin is made to traverse circles of varying diameters, which operation gives the crank greater or less length, according to the required service, and this variable length of crank requires a correspondingly-variable stroke of the piston or pistons of the driving-cylinder, which I will now describe.

Figure 22:
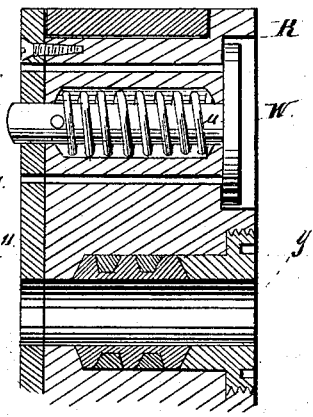

The two cylinders B B' are alike, with the exception of the stop-motion for the cut-off. Therefore the cylinder B and its parts will only be described in the singular, the other being its counterpart, with the exception noted, and for the further reason that I do not limit my improvements to a two-cylinder or double-cylinder engine, for they can be successfully operated by a single cylinder, and I do not limit myself, so far as the improvements hereinbefore described are concerned, to an oscillating engine, although the double-cylinder oscillator which I have shown I believe to be best adapted to fully utilizing all of my improvements. The cylinder B in the mode of its construction is made in the usual manner and provided with the usual heads and stuffing-box for the piston-rod. The upper head, or the one nearest the crank, I provide with the bent bar L, arranged with the cross-head M to take the side thrust when applying power to the crank, so that there is no springing or binding of the piston-rod upon the cylinder-head or the stuffing-box, as the rod L keeps the piston-rod always in position and in line. The piston-rod P is provided with the usual piston-head, Q, and also with a secondary piston-head, R, and the cylinder is provided with another secondary piston-head, R', the details of which are shown on Sheets 6 and 7. The secondary or false piston-head R is provided with a stuffing-box, $y$, which fits around the piston-rod, but not so closely or tightly as to prevent it from moving thereon. The secondary head R' differs only in the respect of being without a stuffing-box or opening for the piston-rod, a valve taking its place. These secondary heads are so constructed that the steam may pass through them to the main or ordinary piston-head by means of the valves V or W. The valve V is conical, and is held to its seat by a spring, $u$, which is just sufficient to hold it. The valve W is provided with a similar spring, but is arranged so that its stem fits closer than with the other form, and each valve-seat is provided with a row of holes or steam-passages, $v$, through which the steam passes whenever the valve is elevated, while with the form V the steam-passage is formed by the lifting of the valve away from its seat sufficient to open a steam-passage around it. The valve-stems project a little beyond the heads, as shown in Figs. 20 and 22, so as to open the valves whenever the secondary heads come in contact with the cylinder-heads, and in order to prevent their coming in contact with any force the cylinder-heads are provided with annular grooves $x$, which the annular projections $w$ fit, which arrangement forms a cushion between the two. The piston-head Q is provided with an ordinary ring-packing, and the secondary heads should also be provided with packings.

The cylinder B is supported upon hollow trunnions, which are suitably connected on one side for the reception of live steam and on the opposite side for the disposal of exhaust-steam, which steam passes into and out of the hollow trunnions, as shown at Fig. 9. The cylinder shown has attached to its under side a steam or valve chest, S, which is cylindrical and of the same length as the cylinder. Two cut-off valves, *l*, are arranged in this chest and connected together by a rod, *k*, as shown in Fig. 7. The steam passes into this cylinder or chest through the side ports, *q*, and into and out of the cylinders through the ports *r*, which are alternately connected with the steam-ports *q* and the exhaust-ports *s* as the valve *l* is moved back and forth or as the cylinder moves. By this arrangement of the steam-chest, the ports *q*, and the valves *l* the end pressure upon the valves is equalized, as in all positions there is live steam of the same pressure at each end of the cylinder or chest S; and by providing the valves *l* with the large circumferential grooves shown, and connecting the exhaust-ports together, the pressure around each of the cut-off valves is equalized in respect to the exhaust-steam, and by keeping exhaust-steam around these valves they are always properly lubricated when steam is used.

The steam-chest is provided with an extension, T, Figs. 8 and 9, into which, however, the steam does not enter. This extension is provided with a cross-shaft, *m'*, to which an arm, *m*, and a lever, *n*, are firmly attached, the arm *m* being inside of the extension and the lever *n* outside. The arm *m* is provided at its upper end with a pin, which projects into the notch or opening of the valve rod or bar *k*, and the pin is so located that it will have sufficient play in said notch without escaping therefrom during the oscillation of the engine or cylinder B. The lever *n* at its outer end is provided with a head or slide, *o*, which slides on proper guideways in the bracket U. By attaching the arm *m* and the lever *n* rigidly to the shaft *m'* and supporting the outer end of the lever *n*, so that it can have only an endwise movement, the rocking of the engine or cylinder over the arm *m*, which remains in a fixed position, shifts the cut-off valves at the proper time and with a movement always corresponding to the movement of the cylinder, for if the crank-pin is at its extreme limit, so that the piston makes a full stroke, the cut-off valves will be moved by the rod *k* so as to fully open the ports *r*, whereas if the piston is working on a short stroke the ports will be only partly open and the required amount of steam only will be admitted, so that by this adjustment of the cut-offs and the arrangement of the cut-off valves steam is admitted to exactly correspond with the work of the engine, and the ports are opened in full or in part, according to the oscillation of the cylinder, and therefore the same stroke is made in the same time, whether the crank is working in its smallest or largest circle, and the steam is always worked at full pressure from one end of the stroke to the other. In respect to this stop-motion I have found that in the working of two cylinders on quarters the cylinder B' requires the stop-motion to be differently arranged to this extent, that the lever *n*, instead of being at a right angle with the arm *m*, is placed in line with it, as shown by the dotted lines *n'*, Fig. 9. In this position the lever *n* is provided with a pin, which prevents the lever from rotating, which pin may be connected directly or by a rod with some fixed part of the base or frame-work of the engine. This change in the stop-motion is necessary to prevent the engines from working against each other when two are used "on quarters," by which is meant connecting at a right angle to each other when attached to the crank-pin, instead of being attached to the pin on opposite sides.

In the operation of the variable stroke of the piston the steam alternately enters the ports *r*, which movement at first drives the secondary heads against the piston-head, as shown in Fig. 17, and they remain in this position as long as the engine is on the full stroke. As the stroke shortens they assume the positions shown in Figs. 16, 15, and 14, which last position, Fig. 14, is that of the shortest stroke.

The spaces between the head Q and the false heads R R', when the piston is taking less than a full stroke, are at first filled with steam, which is held therein by the valves V or W as long as the steam-tension is the same between the false heads as that between the false heads and the cylinder heads or ends. In case of any material diminution, the valves will allow additional steam to enter, and thus keep the tension equalized, and after the machine has been in operation a short time the spaces between the false heads and the piston-head will become filled with water, so that the whole will move as a nearly-solid device or as increasing the length of the piston-head equal to the length of the distance between the false heads. In case the working of the engine necessitates a longer stroke, then the false heads will come in contact with the cylinder-heads, so that the projecting stems of the valves V or W will open those valves and allow so much of the imprisoned steam or water to escape as is necessary to make the desired length of stroke, so that the cylinder B will take the exact amount of steam required for each stroke, and no more.

The cut-offs *l* will be arranged or not, as desired, to work steam expansibly, which arrangement is effected by slightly increasing or diminishing the distance between them on the rod *k*. It will be found advantageous to work expansively.

It will be understood from the previous statement that, with the exception of the stop-motion, the cylinders B B' are in all respects identical; also, that the self-adjusting crank may be worked with a single oscillating steam-cylinder—that is, with either one of the cylinders B or B' working alone or working in the absence of the other; also, that the self-adjusting features of my improved crank can be used with a stationary or fixed engine.

I propose to use the improvements herein described with steam, compressed air, or hot air, and in using compressed air I propose to pass it through hot water, so as to heat it and cause it to take up sufficient moisture to keep the parts lubricated, and to eventually fill the spaces between the piston-head and the false heads with water, as in the case of steam.

I also propose to use my improvements in connection with stationary or traveling engines. They are especially adapted to locomotive or other engines running upon a prepared track, for when a high rate of speed is attained or on downgrades the self-adjusting crank will work on short centers, and thus maintain a high rate of speed without unnecessarily exhausting the boiler, which will effect a great saving in the steam and in the wear and tear of the machinery, and the oscillating form of engine is especially adapted to the use of compressed air, for in using compressed air, especially in traveling engines, it is of great importance not to use more than is absolutely required for the movements, so that when compressed air is carried in a reservoir, as in street-engines, no more will be used than is necessary for the movement of the car or cars, and the amount will always be proportioned to the exact service required, to the great saving of the power stored in the reservoir. It will of course be understood that when used for traveling engines—either steam or air—the base A will not be used, but the parts will be suitably attached to the carriage, which takes the place of the base, and the parts will be properly distributed and arranged for such service.

For driving traveling engines each end of the axle may be provided with adjustable cranks and the cylinders B B' located on opposite sides.

In some places or forms of machinery three single-acting cylinders may be used in place of the two double-acting ones shown, and in such a construction the secondary or auxiliary pistons R will be omitted and the three cylinders will be arranged "on thirds" instead of "on quarters."

I do not limit myself to the use with oscillating engines of such of my improvements as are applicable to other engines and machinery.

The form and construction of the engine shown and described are especially adapted for use in driving marine propeller-wheels and elevators.

What I claim as new, and desire to secure by Letters Patent, is—

1. The combination of the cylinders D with one or more cylinders, B, and connecting pipe or pipes for giving all cylinders the same interior pressure, substantially as described.

2. The combination of the shaft $a$, having the passages $b$, $b'$, and $j$, with the tubes $g$ $h$, cylinders D, and plungers E, substantially as specified.

3. The combination of the box $i$ with the perforated shaft $a$, eccentric H, and disk or plate C for forming an annular passage between them, substantially as set forth.

4. The combination of the perforated shaft $a$ and eccentric H with the hollow shaft $a'$, disk C, pipes $g$ $h$, cylinders D, plungers E, cross-head F, sliding block G, and pin $c$, substantially as specified.

5. The unattached secondary or auxiliary piston-heads or followers R R', in combination with the piston-head Q, rod P, and cylinder B, substantially as and for the purpose set forth.

6. The secondary or auxiliary head R', having valves opening toward the head Q, for holding or imprisoning the fluid between the head Q and the secondary head, substantially as described.

7. The combination of the head R', having one or more valves with projecting stems, in combination with cylinder B, whereby a portion of the imprisoned fluid is permitted to escape when the same comes in contact with the cylinder-head, and an increased length of piston-stroke obtained, substantially as specified.

8. An unattached auxiliary piston-head or follower having valves with projecting stems, in combination with an inclosing cylinder and a piston-head, whereby the pressure on opposite sides of the auxiliary head is equalized and the length of piston-stroke automatically changed or adjusted to the throw of a variable crank, substantially as specified.

9. The combination of a steam or air cylinder having a piston and auxiliary or secondary piston-head or follower with a variable crank, substantially as and for the purposes described.

10. The combination of the cylinder B, having the guide-yoke or bent bar L, with the piston P Q, cross-head M, variable crank-pin $a''$, and auxiliary piston-heads or followers R R', substantially as and for the purposes specified.

11. The stop-motion $m$, $m'$, and $n$, in combination with the slotted or notched bar $k$ and cut-off valves $l$, substantially as described.

12. In an oscillating engine, the combination of the non-rotating arm or lever $n$, rock-shaft $m'$, and arm $m$ with the notched or slotted valve-rod $k$, valves $l$, and ports $r$, with a variable-stroke piston, whereby the quantity of steam admitted into the cylinder varies with the length of stroke, substantially as set forth.

13. The combination of the stop-motion $m$ $m'$ $n$, valve-rod $k$, valves $l$, with the ports $q$ $r$ $s$ $t$, oscillating cylinder B, variable piston P Q, having auxiliary heads R R', and a variable crank-pin, $a''$, substantially as specified.

14. The combination of an engine-cylinder having a variable-stroke piston, constructed substantially as described, with a variable main-shaft crank constructed and operating substantially as set forth.

15. The combination of an engine-cylinder, having a self-adjusting variable-stroke piston, with a self-adjusting main-shaft crank and a variable self-adjusting cut-off, substantially as specified.

WILLIAM H. CLARK.

Witnesses:
O. W. BOND,
ALBERT H. ADAMS.